UNITED STATES PATENT OFFICE.

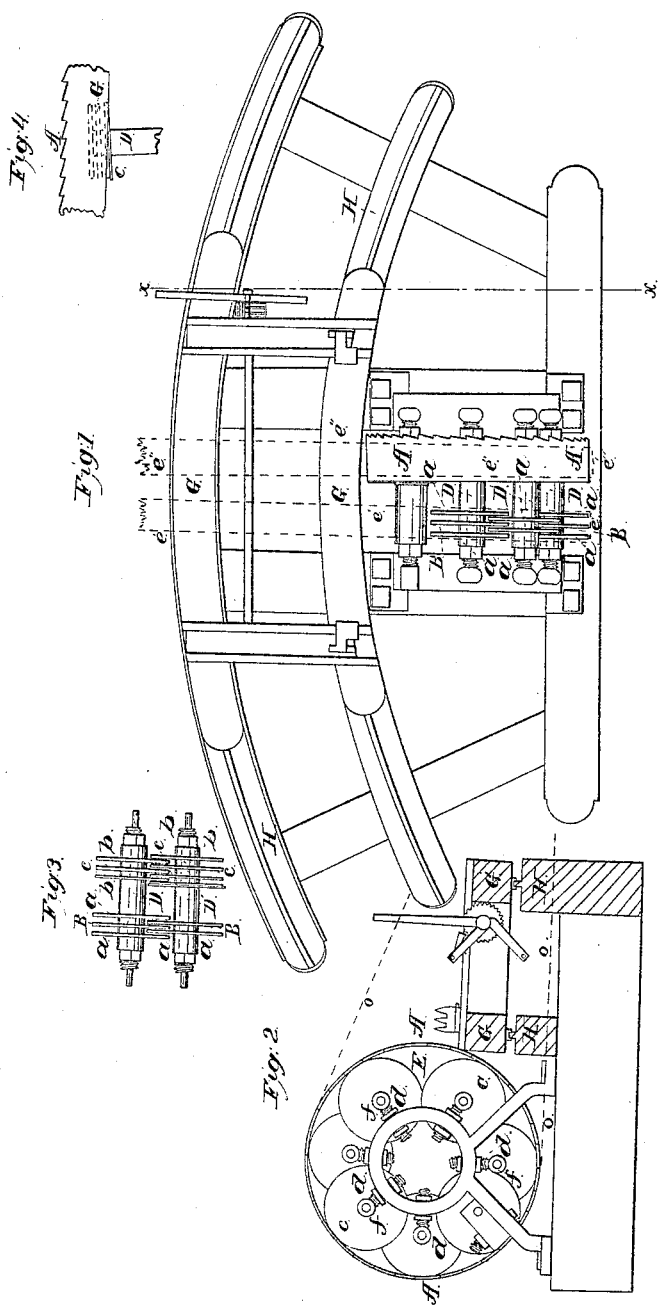

ROBERT STEWART, OF MICHIGAN CITY, INDIANA.

MACHINE FOR SAWING BILGED STAVES FOR BARRELS, CASKS, &c.

Specification of Letters Patent No. 2,372, dated November 25, 1841.

*To all whom it may concern:*

Be it known that I, ROBERT STEWART, of Michigan City, in the county of Laporte and State of Indiana, have invented certain Improvements in Machinery for Sawing Staves for Barrels, Kegs, &c., by Means of which They are brought to the Proper Curvature both Lengthwise and Transversely; and I do hereby declare that the following is a full and exact description thereof.

My machine is of that kind in which the saw is made in the form of a hoop, which has teeth upon one of its edges; but in its cross section and in the construction and arrangement of the parts with which it is combined, it differs materially from those which have been heretofore employed.

In the accompanying drawing, Figure 1 is a top view, or plan, of the instrument. Fig. 2, is a front view of the stand which supports the saw and of a section across the frame in the line $x$, $x$, of Fig. 1.

A, A, is the saw, having teeth on its front edge; this saw is to be of the same diameter, or nearly so, with the barrel, or other vessel which is to be made, and in its cross section it is curved both within and without; its outer surface being convex, and its inner surface concave, the radius of this curvature being that which is to be given to the stave lengthwise; by making the saw somewhat thinner on its back than it is on its front edge, it will cut free and clean with little or no set to the teeth. In driving this saw I apply a band or belt on its exterior surface, in the same manner in which belts are ordinarily applied to a whirl, or drum, and I also apply friction wheels on its interior, by which wheels said saw is sustained, and which also aid in driving it. The friction wheels, and the whirls which receive the band by which they are driven, are peculiar in their construction.

B, B, are whirls which are placed upon the same shaft with the friction wheels $c$, $c$, which bear against the interior of the saw. Were these whirls and friction wheels of the ordinary construction they must necessarily be made so small in diameter as to require to be driven with a degree of velocity incompatible with the proper action of the machine; but by my mode of constructing them I can nearly double their diameter and yet employ the same number to sustain the saw and the band as when those of a smaller size are used. In Fig. 3, I have shown two of the friction wheel and whirl or pulley shafts, with the whirls and friction wheels upon them.

B, B, are the whirls, and C, C, are the friction wheels, which are similarly constructed. They each consist of circular plates or disks of metal $a$, $a$, and $b$, $b$, fixed upon the shafts D, D', in such a manner as that those which are fixed upon one shaft shall be received, and revolve, between those fixed on the other shaft without touching each other. Suppose the shafts D, D', to be an inch and three fourths in diameter, and the whirls and friction wheels to be nine inches in diameter, and the peripheries of the disks to be nearly in contact with the shafts, it will be seen that the required condition of a greatly increased diameter will be attained while there may be the same number of bearing points on the interior of the saw and on the band or strap by which the wheels are driven, and that from the increased diameter these bearing points will operate more efficiently than when smaller circles are employed.

To sustain the back edge of the saw as its teeth are forced against the stuff to be cut, the back plate, or disk $c$, of the friction wheels is made of larger diameter than the others, so as to constitute flanches against which it bears; in this respect there is not any novelty in the construction, but to keep the saw up to this bearing at all times, and principally when the saw carriage is being gigged back, I give a slight obliquity to the shafts of the friction rollers, so that they do not stand parallel with the axis of the saw; this obliquity being given in the proper direction to cause the gathering of the friction wheels on the interior of the saw to force it backward against the flanches $c$, $c$. This is exemplified in Fig. 4, where A, is a segment of the saw D, one of the shafts drawn obliquely to it, throwing the friction wheel C, shown in dotted lines, into a position to force the saw against the flanch $c$.

The hoop saws which have heretofore been employed for the sawing of staves have been made to saw them straight, lengthwise; but as by my machine the staves are curved in both directions, I combine with my saw and its appendages, a curved carriage and ways, adapted to the staves to be cut. G, G, is the carriage and H, H, the ways upon which it moves. I do not represent any particular manner of feeding the stuff to the saw, of setting it, or of backing the carriage, but render the apparatus for this purpose self acting, in any of the various known ways adapted thereto. In Fig. 2, *d, d, d,* are set screws by means of which the bearings, *f, f,* of the shafts of the friction wheels are regulated.

The space E, between the saw and the friction wheels admits of the passing of the stave as it is cut. In driving this machine two bands are to be used, one of which, as before observed, passes around the saw, and the other around the whirls B, B. These two belts pass in the same direction being that indicated by the dotted lines *e, e,* Fig. 2, the same drum serving to give motion to both belts. The dotted lines *e′, e′,* Fig. 1 show the situation of the belt, or strap, which embraces the whirls B, B, and by which they and the friction wheels on the shafts D, D′, are driven. The dotted line *e″, e″,* in like manner represents the manner of passing a belt around the saw A, which is consequently driven by the strap *e″,* and by the action of the friction wheels C, C.

Having thus fully described the nature of my improvements in the machine for sawing staves, what I claim therein as new and desire to secure by Letters Patent, is—

1. The manner of driving the saw, by means of the strap or band on its outside in combination with the arrangement for driving it by means of the friction wheels on interior as set forth.

2. The manner of keeping the hoop saw up to its bearing on the back plate, or flanch of the friction wheels, by placing the shafts of said friction wheels out of parallelism with the axis of the saw as herein set forth.

R. STEWART.

Witnesses:
   THOS. P. JONES,
   WASHN. PEALE.